(12) United States Patent
Miyano et al.

(10) Patent No.: US 6,261,345 B1
(45) Date of Patent: Jul. 17, 2001

(54) PROCESS AND APPARATUS FOR RECOVERING AMMONIA

(75) Inventors: Yasusada Miyano; Kenji Otsuka; Satoshi Arakawa, all of Kanagawa-ken (JP)

(73) Assignee: Japan Pionics Co., Ltd., Tokyo (JP)

( * ) Notice: Subject to any disclaimer, the term of this patent is extended or adjusted under 35 U.S.C. 154(b) by 0 days.

(21) Appl. No.: 09/413,899

(22) Filed: Oct. 7, 1999

(30) Foreign Application Priority Data

Mar. 10, 1999 (JP) .................................................. 11-062631

(51) Int. Cl.$^7$ .............................................. B01D 53/047
(52) U.S. Cl. .................................. 95/96; 95/106; 95/115; 95/128; 96/130; 96/146
(58) Field of Search ........................ 95/95–106, 114–115, 95/128; 96/130, 143–146

(56) References Cited

U.S. PATENT DOCUMENTS

| | | | | |
|---|---|---|---|---|
| 1,660,642 | * | 2/1928 | Barnebey | 95/128 X |
| 1,934,075 | * | 11/1933 | Lewis | 95/100 |
| 2,253,907 | * | 8/1941 | Levine | 96/146 X |
| 2,450,289 | * | 9/1948 | Marek | 96/146 X |
| 3,037,338 | * | 6/1962 | Thomas | 95/104 |
| 3,164,452 | * | 1/1965 | Westeren et al. | 96/130 X |
| 4,036,944 | * | 7/1977 | Blytas | 95/95 X |
| 4,317,808 | * | 3/1982 | Voigt et al. | 95/128 X |
| 4,405,343 | * | 9/1983 | Othmer | 95/115 X |
| 4,661,133 | * | 4/1987 | Lavie | 95/128 X |
| 4,689,062 | * | 8/1987 | MacLean et al. | 95/128 X |
| 5,165,247 | * | 11/1992 | Rockenfeller et al. | 95/128 X |
| 5,298,054 | * | 3/1994 | Malik | 95/104 X |
| 6,066,192 | * | 5/2000 | Toshinaga et al. | 95/99 X |
| 6,103,143 | * | 8/2000 | Sircar et al. | 95/98 X |

FOREIGN PATENT DOCUMENTS

| | | | | |
|---|---|---|---|---|
| 2950983 | * | 6/1980 | (DE) | 96/143 |
| 2281229 | * | 3/1995 | (GB) | 96/146 |
| 55-022332 | * | 2/1980 | (JP) | 96/146 |
| 1606160 | * | 11/1990 | (SU) | 96/146 |

* cited by examiner

*Primary Examiner*—Robert H. Spitzer
(74) *Attorney, Agent, or Firm*—Oblon, Spivak, McClelland, Maier & Neustadt, P.C.

(57) ABSTRACT

There are disclosed a process for recovering ammonia which comprises installing a shell and multi-tube adsorber which is equipped with plural adsorption tubes each packed inside with an ammonia adsorbent (e.g. synthetic zeolite) and equipped with a flow mechanism for a heat transfer medium for performing heat exchange through the adsorption tubes, passing an ammonia-containing gas through the adsorption tubes, while cooling the adsorbent with a heat transfer medium (e.g. water) to adsorb the ammonia, and thereafter collecting the adsorbed ammonia through desorption, while heating the adsorbent with a heat transfer medium (e.g. hot water) under reduced pressure; and an apparatus for the above process. The process and apparatus can recover a large amount of ammonia with high purity in high yield in a short period of time and at need in a continuos manner, prevent the deterioration of adsorption performance by forced cooling of the adsorbent, and prevent the lowering of the desorption rate by forced heating of the adsorbent.

8 Claims, 1 Drawing Sheet

PROCESS AND APPARATUS FOR RECOVERING AMMONIA

BACKGROUND OF THE INVENTION

1. Field of the Invention

The present invention relates to a process and an apparatus for recovering ammonia. More particularly, the present invention pertains to a process and an apparatus for efficiently recovering ammonia from a large amount of a gas containing ammonia with a high concentration.

2. Description of the Related Arts

Ammonia is widely used not only as a raw material for chemical industries but also for the formation of a nitride film in the production of ornaments, carbide tools and semiconductors. After being used, the remaining ammonia is converted into a low-value substance or a valueless substance, which is subjected to an exhaust gas treatment, or exhausted in part into the atmosphere without being treated. In addition a large amount of useful ammonia is exhausted on occasion depending upon the step in which ammonia is used. For example, in the production of a compound semiconductor such as a gallium nitride film, most of ammonia is exhausted as such from a compound semiconductor manufacturing unit without causing any reaction at a high concentration. Such being the case, a great expense is required for a harm-removing treatment of ammonia. Thus the recovery of ammonia is eagerly desired from the viewpoints of both the environmental science and the effective utilization thereof as a valuable resource. In such circumstances, the present invention provides a process and an apparatus for efficiently recovering ammonia.

An ammonia-containing exhaust gas generated after the use of ammonia has heretofore been seldom recovered as such in usable form of ammonia, since ammonia is a relatively inexpensive compound. Instead, the ammonia-containing exhaust gas has been subjected in many cases to exhaust gas treatment by a method in which ammonia is removed, ammonia is made harmless or the like so as to discard said exhaust gas.

There have been known as a process for treating ammonia-containing exhaust gas, a combustion treatment process, a wet absorption process, a dry adsorption process, a decomposition treatment process, a combinational process of decomposition and dry adsorption and the like. However, the above-mentioned processes involve such problems as described hereunder.

The combustion treatment process suffers from the defect that a fuel such as propane is necessary for combustion treatment, the applicable range of a combustion unit is narrow for load variation, and nitrogen oxides are by-produced accompanying the combustion of ammonia. The wet absorption process in which an acidic aqueous solution is employed suffers from the disadvantage that the by-produced ammonium salt is difficult to dispose of. The dry adsorption process in which ammonia is made harmless by chemical adsorption suffers from the drawback that the use of an expensive adsorbent causes a high treatment cost in the case of treating a large amount of ammonia-containing exhaust gas.

On the other hand, the decomposition treatment process in which ammonia is decomposed into nitrogen and hydrogen by bringing ammonia into contact with an ammonia decomposition catalyst under heating can not completely decompose ammonia, since a part thereof remains undecomposed on the basis of chemical equilibrium. There is also known a combinational process of decomposition and dry adsorption in which ammonia is decomposed into nitrogen and hydrogen by bringing ammonia into contact with an ammonia decomposition catalyst under heating, followed by cleaning of the undecomposed ammonia by the use of a dry adsorbent. Nevertheless, said process suffers from the shortcoming that the use of an expensive adsorbent causes a high treatment cost in the case of treating a large amount of ammonia-containing exhaust gas.

As described hereinbefore, any of the above-mentioned processes for treating ammonia as the exhaust gas is each defective, and besides is not intended to recover ammonia as a useful substance. That is to say, the basic problem remains unsolved in that a useful substance as a raw material for chemical industries or semiconductor manufacturing is converted unfavorably into a valueless or low-value substance at a considerable cost.

On one hand, there is employed a large amount of highly pure ammonia in the production of a nitride film semiconductor and the like. In this case, however, most of ammonia is exhausted as such without causing any reaction at a high concentration and further in a large amount, and therefore it is disadvantageous to apply any of the foregoing processes to the treatment of the ammonia-containing exhaust gas.

An efficient recovery of the ammonia thus used, if made possible, can favorably contribute to not only the effective utilization of a resource but also environmental preservation. However, there is not yet proposed a process for efficiently recovering the ammonia.

SUMMARY OF THE INVENTION

A general object of the present invention is to develop and provide a process and an apparatus for efficiently recovering ammonia from a large amount of a gas containing ammonia with a high concentration.

Under such circumstances, intensive extensive research and investigation were accumulated by the present inventors in order to achieve the above-mentioned object. As a result, it has been found that ammonia contained in an ammonia-containing gas can be efficiently captured through adsorption by passing the aforesaid gas through adsorption tubes which are packed inside with an adsorbent such as synthetic zeolite or activated carbon and which are cooled by passing a heat transfer medium through the outside of the adsorption tubes, and also that the ammonia thus captured through adsorption can be collected in high yield within a short period of time by desorbing the ammonia under reduced pressure, while heating with a heat transfer medium, the inside of the adsorption tubes wherein ammonia has been adsorbed onto the adsorbent. The present invention has been accomplished by the foregoing findings and information.

Specifically, the present invention relates to a process for recovering ammonia which comprises installing at least one shell and multi-tube adsorber which is equipped with a plurality of adsorption tubes each packed inside with an ammonia adsorbent and equipped with a flow mechanism for a heat transfer medium for performing heat exchange through said adsorption tubes, passing an ammonia-containing gas through said adsorption tubes, while cooling the inside of said adsorption tubes with a heat transfer medium so as to capture the ammonia contained in said gas through adsorption, and thereafter collecting the captured ammonia through desorption, while heating the inside of said adsorption tubes with a heat transfer medium under reduced pressure.

The present invention pertains also to an apparatus for recovering ammonia which comprises at least one shell and multi-tube adsorber which is equipped with a plurality of adsorption tubes packed inside with an ammonia adsorbent and equipped with a flow mechanism for a heat transfer medium for performing heat exchange through said adsorption tubes, and a pump for evacuating the inside of said adsorption tubes of the adsorber at reduced pressure, said apparatus having such constitution that is capable of passing an ammonia-containing gas through said adsorption tubes, while cooling the inside of said adsorption tubes with a heat transfer medium so as to capture the ammonia contained in said gas through adsorption, and thereafter collecting the captured ammonia through desorption, while heating the inside of said adsorption tubes with a heat transfer medium under reduced pressure.

The present invention is further concerned with a process and an apparatus for efficiently recovering ammonia in high yield within a short period of time that are each characterized by its capability of preventing the deterioration of adsorption performance due to the temperature rise of the adsorbent owing to the heat of adsorption, by forcibly and efficiently cooling the adsorbent through the heat exchange with a heat transfer medium. In addition, said process and apparatus are each characterized by its capability of preventing the lowering of the desorption rate due to the temperature drop of the adsorbent accompanying the heat of ammonia vaporization at the time of desorbing the ammonia thus adsorbed, by forcibly and efficiently heating the adsorbent.

It is made possible by adopting such constitution as mentioned hereinbefore to miniaturize the ammonia recovering apparatus, since a large amount of ammonia can be adsorbed with a small amount of an adsorbent and the ammonia thus adsorbed can be desorbed within a short period of time, and besides it is made possible thereby to carry out both the cooling and heating of the adsorbent, since heat exchange between the adsorbent and a heat transfer medium is favorably performed by the combination of cooling water and hot water without the need of a special heat transfer medium.

Figure 1:
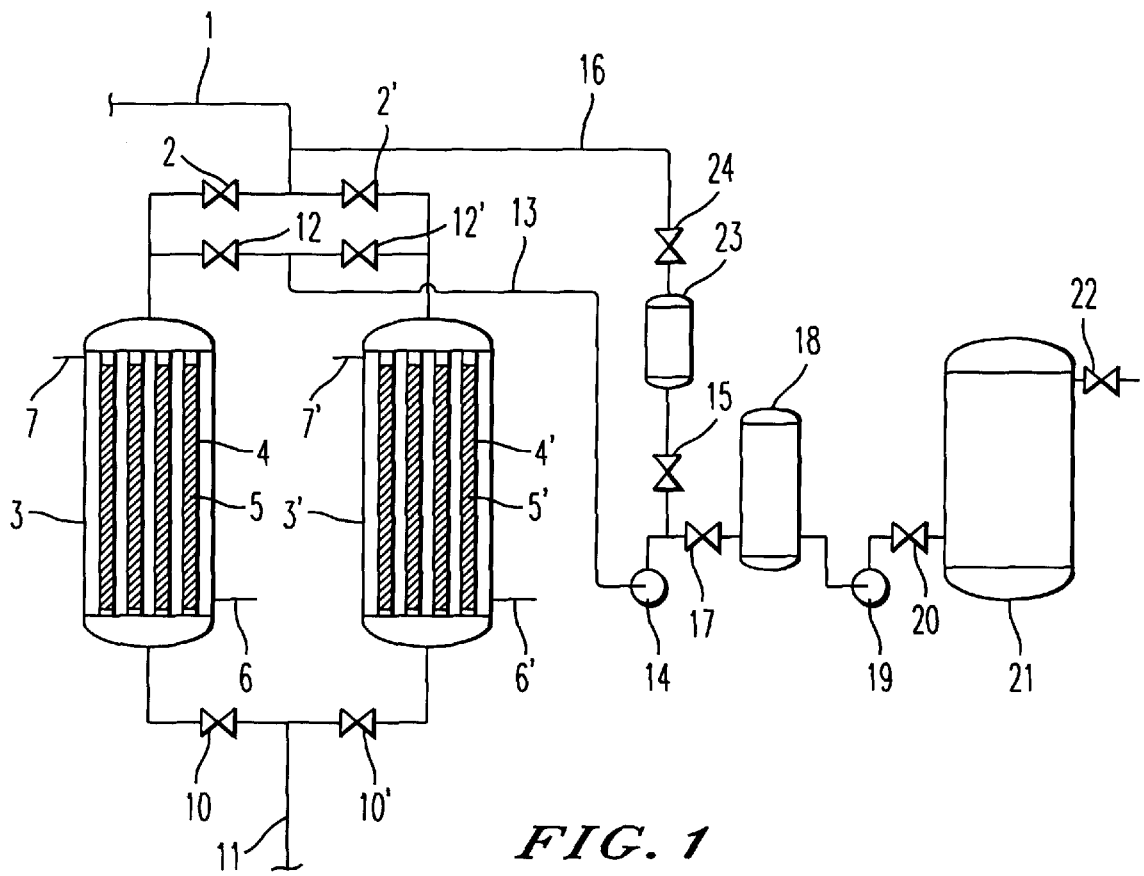
FIG. 1 is a schematic illustration showing an example of ammonia recovering apparatus according to the present invention.

1: ammonia exhaust line
2, 2', 10, 10', 12, 12', 15, 17, 20, 22, 24: valve
3, 3': adsorber
4, 4': adsorption tube
5, 5': adsorbant
6, 6': heat transfer medium inlet
7, 7': heat transfer medium outlet
8a, 8b: tube plate
9: shell portion
11: exhaust line
13: ammonia recovery line
14: vacuum pump
16: exhaust gas circulation line
18: buffer tank
19: pressurizing pump
21: recovered ammonia tank
23: surge tank

DESCRIPTION OF THE PREFERRED EMBODIMENTS

The present invention is mainly applied to the process for recovering ammonia from a large amount of gas containing ammonia in relatively high concentration.

By the term "gas containing ammonia (ammonia-containing gas)" as mentioned herein is meant a gas wherein ammonia is contained in a gas or mixed gas which does not react with ammonia at ordinary temperature and pressure. The above-mentioned gas is not specifically limited to but exemplified by a gas containing ammonia in hydrogen, nitrogen, helium, argon and the like. The concentration of ammonia contained in the ammonia-containing gas is not specifically limited, but includes various concentrations thereof ranging from low to high concentrations.

In the following, specific description will be given of the shell and multi-tube adsorber according to the present invention with reference to FIG. 2.

Figure 2:
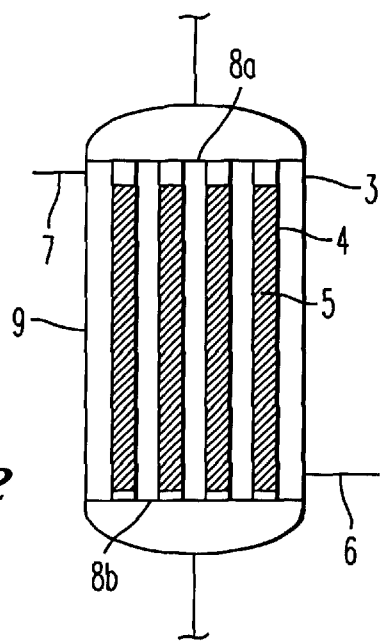
FIG. 2 is a schematic illustration showing an example of ammonia adsorber according to the present invention.

The shell and multi-tube adsorber 3 as mentioned in the present invention is an adsorber in which a number of tubes (adsorption tubes) that are each packed inside with an adsorbent 5 are housed in a shell through two tube plates 8a, 8b as shown in FIG.2. The adsorber 3 is constituted so as to enable the ammonia-containing gas to flow through each of the adsorption tubes 4, enable cooling water or hot water or other heat transfer medium such as steam to flow from the heat transfer medium inlet 6, to the heat transfer medium outlet 7, through the space between the shell portion 9 and the adsorption tubes 4 that are put between both the tube plates 8a, 8b, and also enable to heat or cool the adsorbent 5 when necessary. Said shell and multi-tube adsorber 3 has the constitution same as that of a shell and multi-tube heat exchanger or a shell and multi-tube reactor each being used in the field of chemical industries.

The ammonia adsorbent to be employed in the present invention is not specifically limited, provided that it is capable of physically adsorbing a large amount of ammonia and of readily releasing the ammonia thus adsorbed by selecting the operation conditions such as variation of temperature, pressure or the like. Usable adsorbent, which satisfies said requisite characteristics is exemplified by synthetic zeolite (molecular sieve 13X, 5A, etc.), silica gel, alumina, activated carbon and the like.

In the following, specific description will be given of the ammonia recovering apparatus according to the present invention with reference to FIG. 1.

The adsorption and desorption of ammonia can be put into practice with one-train shell and multi-tube adsorber in the present invention by firstly performing ammonia adsorption operation, then discontinuing the feeding of the ammonia-containing gas, and subsequently performing ammonia desorption operation. Preferably however, shell and multi-tube adsorbers are installed with at least two trains in parallel so as to enable alternate changeover, and are each subjected in turn to ammonia adsorbing capturing operation and its desorption operation in order to continuously recover ammonia.

FIG. 1 is a schematic illustration showing one example of an ammonia recovering apparatus having such constitution that enables ammonia to be continuously recovered from an ammonia-containing gas by a method in which shell and multi-tube adsorbers are juxtaposed in two trains in parallel, and alternate changeover is carried out between the adsorbers, that is, one of the adsorbers performs ammonia adsorbing operation, while the other performs ammonia desorbing operation. In more detail, the ammonia-containing gas passes through the ammonia exhaust line 1 and the valve 2, and is introduced to the top of the adsorber 3, into the adsorption tubes 4 packed inside with the adsorbent 5. At this time, it is made possible to prevent the deterioration of adsorption performance due to the temperature rise of the adsorbent 5 owing to the heat of adsorption, by passing a heat transfer medium such as cooling water from the heat transfer medium inlet 6 to the heat transfer medium outlet 7.

The gas from which ammonia has been removed is introduced to the exhaust line 11 through the valve 10.

At the point of time when the ammonia adsorption with the adsorbent 5 reaches the saturated adsorption or close to the saturated adsorption, the valves 2, 10 are closed and the valves 2', 10' are opened to make changeover of the ammonia passage to the adsorption tubes 4' that are packed inside with the adsorbent 5' and housed in the adsorber 3' equipped with the heat transfer medium inlet 6' and the heat transfer medium outlet 7' so as to initiate ammonia adsorption. Subsequently, the valve 12 is opened and the adsorption tubes 4 are evacuated by means of the vacuum pump 14 through the ammonia recovery line 13 for a short period of time, when the recovered gas is introduced in the surge tank 23 through the valve 15 opened. Thereafter, the valves 17, 20 are opened in the state that the valve 15 is closed and the vacuum pump 14 is in operation, the pressurizing pump 19 is operated and at the same time, the adsorption tubes 4 are heated by passing a heat transfer medium such as hot water or steam through the space between the adsorption tubes 4 and the shell of the adsorber 3 to recover the desorbed ammonia in the recovered ammonia tank 21 through the buffer tank 18. The ammonia thus recovered is stored in the recovered ammonia tank 21, and is taken out at need through the valve 22.

After the completion of ammonia recovery, the evacuation of the adsorption tubes 4 is discontinued, and the adsorbent 5 in the adsorption tubes 4 is allowed to cool to around ordinary temperature. At the same time, in the adsorption tubes 4 is introduced the outlet gas from the adsorber 3' or an inert gas coming from piping equipped otherwise so that the pressure in the adsorption tubes 4 is brought back to atmospheric pressure so as to prepare for the next changeover operation.

The operation of the adsorber 3' is put into practice in the same manner as in the adsorber 3, but the operation after the completion of ammonia adsorption is carried out with the valve 12' being opened instead of the valve 12.

The recovered gas in the surge tank 23 is introduced into the ammonia exhaust line 1 at a low flow rate through the valve 24 and the exhaust gas circulation line 16.

The adsorption tubes to be used for the adsorber according to the present invention has each an inside diameter usually in the range of 25 to 300 mm, preferably 50 to 150 mm. The inside diameter thereof, when being smaller than 25 mm, results in such disadvantage that a large number of adsorption tubes are required because of lessened packing amount of the adsorbent per each tube, thereby not only increasing the production cost of the adsorber but also lowering the volumetric efficiency of the adsorber. On the contrary, the inside diameter thereof, when being larger than 300 mm, gives rise to such defect as the lowering of heat transfer in the case of cooling or heating the adsorption tubes.

The above-mentioned adsorption tubes each have a length usually in the range of 250 to 3,000 mm, preferably 500 to 1,500 mm. The length thereof, when being less than 250 mm, leads to such disadvantage as lessened packing amount of the adsorbent per each tube in spite of intricate structure of the adsorber, whereas the length thereof, when being more than 3,000 mm, brings about such drawback as increased pressure loss for the ammonia-containing gas.

The shapes of the shell portion and shell cover portions (gas introduction portion and gas exhaust portion) are each not specifically limited. However, the shell portion is preferably in the form of cylinder, and at the same time, the shell cover portions are each preferably in the form of cup or dish from the viewpoint of preserving pressure tightness at the time of desorptively recovering ammonia under reduced pressure.

The number of adsorption tubes that are housed in the adsorber is not specifically limited, but is suitably selected or set in accordance with the amount of ammonia-containing gas to be treated, ammonia concentration in said gas, the diameter and length of the adsorption tubes, desired changeover time, the mode of arranging the adsorption tubes in the adsorber and the like factors.

It is possible to install pass partition plates in the space between the adsorption tubes and the shell portion in the adsorber for the purpose of efficiently allow the heat transfer medium to flow therethrough. Moreover, it is possible but not practical to adopt such constitution that the heat transfer medium is passed through the inside of the adsorption tubes housed in the adsorber, and the ammonia-containing gas is passed through the inside of the shell which is packed with the adsorbent.

The material of construction for the ammonia adsorber is not specifically limited, but that for the adsorption tubes is usually selected for use from stainless steel, type SUS 304, SUS 316, SUS 316L, or the like taking into consideration favorable heat conductivity obtainable therefrom without polluting ammonia gas to be recovered or causing corrosion.

The adsorption performance of the adsorbent at the time of adsorbing ammonia in the present invention increases with lowering of its temperature, but the temperature thereof is in the range of usually −30 to 90° C., preferably ordinary temperature to 50° C. from the aspect of easiness of cooling.

The gas is usable as the heat transfer medium for cooling the adsorbent, but is ineffective in promptly cooling it because of low heat capacity of the gas, and accordingly it is preferable to use water or a well known anti-freeze after cooling thereof.

The operation pressure at the time of adsorbing ammonia in the present invention is not specifically limited, but is mainly determined in accordance with the conditions for the origin of the ammonia-containing gas. It is usually in the range of ordinary pressure to 5 kgf/cm$^2$, approx. taking into consideration the pressure tightness of the adsorber to be used as well as the advantage that the higher the pressure, the more the adsorption quantity of ammonia.

The superficial linear velocity (LV) at the time of bringing the ammonia-containing gas into contact with the adsorbent varies depending upon the concentration of ammonia in said gas, and thus can not be unequivocally determined. However, said linear velocity is in the range of usually at most 100 cm/sec, preferably at most 30 cm/sec.

With regard to the operation pressure at the time of recovering ammonia from the adsorbent after ammonia adsorption in the present invention, the easiness of ammonia desorption increases with a decrease in the pressure, but the lower the pressure, the higher the evacuation capacity required of a vacuum pump. Thus said operation pressure is in the range of usually 0.5 to 500 mmHg (66 to 66,645 Pa), preferably 5 to 300 mmHg (666 to 39,986 Pa), approx.

The heating temperature at the time of recovering ammonia from the adsorbent after the adsorption is not specifically limited, and the higher the heating temperature, the easier the desorption. However, the heating temperature is not required to be markedly high, since the evacuation is carried out under reduced pressure, and thus it is in the range of usually 50 to 200° C., preferably 70 to 150° C.

The gas is usable as the heat transfer medium for heating the adsorbent, but is ineffective in promptly heating it because of low heat capacity of the gas, and accordingly it is preferable to use hot water, steam, pressurized hot water or pressurized steam. There is also usable other heat transfer medium such as a high boiling point hydrocarbon.

It is made possible by the present invention to recover ammonia in high efficiency through its adsorption even from a large amount of a mixed gas containing ammonia in high concentration by forcibly cooling the adsorbent with a heat transfer medium at the time of adsorbing ammonia, while preventing the adsorbent temperature from being raised by the heat of ammonia adsorption. On one hand, it is also made possible by the present invention to efficiently collect through desorption, a large amount of ammonia which has been adsorbed in the preceding step within a short period of time, by forcibly heating the adsorbent with a heat transfer medium along with evacuation under reduced pressure at the time of desorbing ammonia, while preventing the adsorbent temperature from being lowered by the vaporization heat of ammonia. It is further made possible by the present invention to heat the adsorbent at a relatively low heating temperature owing to the desorption under reduced pressure, for example, by the use of hot water, whereby the combination of cooling water and hot water can be alternately used as the heat transfer medium, thus contributing to simplify the ammonia recovery apparatus. It is still further made possible by the present invention to simplify and facilitate heating and cooling operations by adopting a shell and multi-tube adsorber which is collectively integrated with a large number of adsorption tubes each having a relatively small diameter and to promptly cool and heat the adsorbent, whereby even a gas containing ammonia in high concentration can be effectively treated, and the adsorbed ammonia can be effectively recovered within a short period of time.

The ammonia thus recovered can be used as such as a raw material, and otherwise can be refined as desired to higher purity by well-known refining technique.

The working effects and the advantages according to the invention are summarized as follows:

1. Ammonia can be efficiently recovered within a short period of time even from a large amount of gas containing ammonia in high concentration.
2. Ammonia adsorption can be efficiently carried out under the condition of high adsorption performance of the adsorbent, since the adsorbent can be prevented from being raised in temperature owing to the heat of ammonia adsorption by virtue of forced cooling with a heat transfer medium at the time of ammonia adsorption.
3. Ammonia recovery can be efficiently carried out within a short period of time, since the adsorbent can be prevented from being lowered in temperature owing to the heat of ammonia vaporization by virtue of forced heating with a heat transfer medium at the time of ammonia desorption.
4. The heat transfer medium can be composed of the combination of water and hot water dispensing with a special heat transfer medium, since heat transfer between the adsorbent and said medium is favorably carried out.
5. The changeover time of the ammonia adsorber can be set on a short time, since it is made possible to proceed with the adsorption operation of a large amount of ammonia with a small amount of adsorbent and also the desorption operation of ammonia within a short period of time.
6. The ammonia recovery apparatus is capable of not only being simplified but also being miniaturized by virtue of the above-mentioned effects and advantages.

In the following, the present invention will be described in more detail with reference to a comparative example and a working example, which however shall not limit the present invention thereto.

EXAMPLE 1

{Fabrication of an ammonia recovering apparatus}

There were prepared two sets of shell and multi-tube adsorbers which were each incorporated with 19 numbers of SUS 316L made adsorption tubes each having an inside diameter of 108.3 mm and a length of 1,500 mm and which had such constitution that enabled a heat transfer medium to pass through the space between the adsorption tubes and the shell of the adsorber. Subsequently, there was fabricated an ammonia recovering apparatus same as that shown in FIG. 1 which was composed of the above-prepared adsorbers whose adsorption tubes were each packed inside with 250 l of molecular sieve 5A as the adsorbent, a vacuum pump, a pressurizing pump, a buffer tank, a surge tank and a recovered ammonia tank, and a cooling water line and a heating water line were connected to the adsorbers so as to enable alternate changeover between both the adsorbers and between the cooling water line and the heating water line.

{Ammonia recovery experiment}

Prior to the start of the experiment, the adsorbent was activated by a method in which gaseous nitrogen was passed through the adsorption tubes 4, 4' to replace the air in the adsorption tubes with the nitrogen; hot water at 90° C. was circulated outside the adsorption tubes and inside the adsorber shell to heat the adsorbent for 5 hours, while the inside of the adsorption tubes was maintained with the vacuum pump at a reduced pressure of at most 5 mmHg (666 Pa); then the adsorbent was allowed to cool to ordinary temperature; and gaseous nitrogen was introduced inside the adsorption tubes to bring the pressure back to atmospheric pressure so as to complete the activation.

Subsequently, ammonia adsorption was carried out in the following manner. Gaseous nitrogen at ordinary temperature and atmospheric pressure containing ammonia by 30% by volume was fed in the adsorption tubes 4 of the adsorber 3 at a flow rate of 0.136 m$^3$/min, while passing cooling water at 25° C. through the inside of the shell. The ammonia adsorption was continued for 8 hours and thereafter, the feeding of the ammonia-containing gas switched to the adsorber 3'. During the adsorption experiment by the use of the adsorber 3, ammonia effluence was not recognized in the outlet gas from the adsorber 3. Subsequently, the inside of the adsorption tubes 4 of the adsorber 3 was evacuated under reduced pressure with the vacuum pump 14 for a short time of one minute in the state that the inside of the adsorption tubes 4 was maintained at around ordinary temperature, during which time the exhaust gas from the adsorption tubes 4 was introduced in the surge tank 23. Then the exhaust line of the vacuum pump 14 was switched to the sides of the buffer tank 18 and the recovered ammonia tank 21. In addition, the cooling water at 25° C. was switched to heating water at 90° C., which was fed to the inside of the shell, while running the pressurizing pump 19. Thus the vacuum evacuation procedure was continued for 5 hours under the above-mentioned heating to complete the ammonia recovery operation. Thereafter the feeding of the heating water was switched to that of cooling water to cool to ordinary temperature, and then part of the outlet gas from the adsorber 3' was fed to the adsorber 3 to bring the pressure back to atmospheric pressure so as to prepare for the next changeover, during which time the recovered gas in the surge tank 23 was introduced to the exhaust line 16 at a low flow rate through the valve 24 and the exhaust gas circulation line 16.

The above-mentioned ammonia recovery procedure was carried out ten times repeatedly with alternate changeover of the adsorbers 3, 3'. As a result, the ammonia recovery rate was 98% or more, and the impurity in the recovered ammonia was only nitrogen in a concentration of 0.15%.

Comparative Example 1

An ammonia recovering apparatus was fabricated in the same manner as in Example 1 except that the apparatus was composed of one adsorption tube as the adsorber which had an inside diameter of 472 mm and a length of 1,800 mm, was packed inside with 250 l (packing length of 1,500 mm) of molecular sieve 5A as the adsorbent, was equipped inside with a thermo-couple for temperature measurement, and further was equipped outside with an electric heater and a thermal insulating material.

Subsequently, ammonia adsorption was carried out by passing through the adsorption tube, gaseous nitrogen at ordinary temperature and atmospheric pressure containing ammonia by 30% by volume at a flow rate of 0.136 $m^3$/min. As a result, the temperature of the adsorbent was sequentially raised from the top portion of the adsorption tube towards the bottom portion thereof, and reached 125° C. after 2 hours from the start of the ammonia adsorption procedure. In addition, after 3 hours therefrom ammonia effluence was recognized at the outlet of the adsorption tube, and accordingly after the lapse of 3.5 hours from the start of the ammonia adsorption procedure, said procedure was interrupted.

An attempt was made to recover the ammonia adsorbed onto the adsorbent by evacuating the adsorption tube under reduced pressure by the use of the vacuum pump, while heating the adsorption tube with the electric heater for 5 hours. As a result, the ammonia was recovered by only 28%, since the temperature was slightly raised at the central portion of the adsorption tube in spite of appreciably raised temperature on the inside wall surface thereof.

What is claimed is:

1. A process for recovering ammonia which comprises installing at least one shell and multi-tube adsorber which is equipped with a plurality of adsorption tubes each having an inside diameter in the range of 25 to 300 mm and a length in the range of 250 to 3,000 mm, each packed inside with an ammonia adsorbent and equipped with a flow mechanism for a heat transfer medium for performing heat exchange through said adsorption tubes, passing an ammonia-containing gas through said adsorption tubes, while cooling the inside of said adsorption tubes with a heat transfer medium so as to capture the ammonia contained in said gas through adsorption, and thereafter collecting the captured ammonia medium under reduced pressure.

2. The process for recovering ammonia according to claim 1, wherein the ammonia adsorbent is at least one member selected from the group consisting of synthetic zeolite, activated carbon, silica gel, alumina and silica alumina.

3. The process for recovering ammonia according to claim 1, wherein the ammonia-containing gas is an exhaust gas coming from a nitride film semiconductor manufacturing unit.

4. The process for recovering ammonia according to claim 1, wherein at least two-train shell and multi-tube adsorbers are equipped and connected to each other so as to enable alternate changeover thereof, and each of the shell and multi-tube adsorbers is made to carry out changeover procedure including adsorptive capturing of ammonia and desorption thereof in turn so that the ammonia can be continuously recovered.

5. The process for recovering ammonia according to claim 1, wherein the ammonia adsorbent is cooled to the range of −30 to 90° C. at the time of adsorption, and is heated to the range of 50 to 200° C. under reduced pressure in the range of 0.5 to 500 mmHg (66 to 66,645 Pa) at the time of desorption.

6. An apparatus for recovering ammonia which comprises at least one shell and multi-tube adsorber which is equipped with a plurality of adsorption tubes each having an inside diameter in the range of 25 to 300 mm and a length in the range of 250 to 3,000 mm packed inside with an ammonia adsorbent and equipped with a flow mechanism for a heat transfer medium for performing heat exchange through said adsorption tubes, and a pump for evacuating the inside of said adsorption tubes of the adsorber at reduced pressure, said apparatus having such constitution that is capable of passing an ammonia-containing gas through said adsorption tubes, while cooling the inside of said adsorption tubes with a heat transfer medium so as to capture the ammonia contained in said gas through adsorption, and thereafter collecting the captured ammonia through desorption, while heating the inside of said adsorption tubes with a heat transfer medium under reduced pressure.

7. The apparatus for recovering ammonia according to claim 6, wherein at least two-train shell and multi-tube adsorbers are equipped and connected to each other so as to enable alternate changeover thereof, and each of the shell and multi-tube adsorbers is made to carry out changeover procedure including adsorptive capturing of ammonia and desorption thereof in turn so that the ammonia can be continuously recovered.

8. The apparatus for recovering ammonia according to claim 6, wherein the ammonia adsorbent is cooled to the range of −30 to 90° C. at the time of adsorption, and is heated to the range of 50 to 200° C. under reduced pressure in the range of 0.5 to 500 mmHg (66 to 66,645 Pa) at the time of desorption.

* * * * *